United States Patent
Rath et al.

(10) Patent No.: US 7,071,275 B2
(45) Date of Patent: Jul. 4, 2006

(54) POLYISOBUTENE AND POLYISOBUTENE DERIVATIVES FOR USE IN LUBRICANT COMPOSITIONS

(75) Inventors: Hans Peter Rath, Grünstadt (DE); Arno Lange, Bad Dürkheim (DE); Helmut Mach, Heidelberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/495,488

(22) PCT Filed: Dec. 18, 2002

(86) PCT No.: PCT/EP02/14486

§ 371 (c)(1), (2), (4) Date: May 13, 2004

(87) PCT Pub. No.: WO03/051932

PCT Pub. Date: Jun. 26, 2003

(65) Prior Publication Data

US 2005/0009998 A1 Jan. 13, 2005

(30) Foreign Application Priority Data

Dec. 19, 2001 (DE) ................................ 101 62 567

(51) Int. Cl.
*C08F 10/00* (2006.01)
(52) U.S. Cl. ............. 526/348.7; 526/217; 526/317.1; 526/272; 526/348; 525/386
(58) Field of Classification Search ........... 526/348.7, 526/217, 317.1, 272, 348; 525/386
See application file for complete search history.

(56) References Cited

U.S. PATENT DOCUMENTS

| 4,152,499 A | * | 5/1979 | Boerzel et al. ............. 525/381 |
| 5,286,823 A | | 2/1994 | Rath |
| 5,703,183 A | * | 12/1997 | Shaffer ........................ 526/189 |
| 6,407,186 B1 | * | 6/2002 | Rath et al. .................... 526/69 |

FOREIGN PATENT DOCUMENTS

| DE | 27 02 604 | | 7/1978 |
| DE | 29 04 314 | | 8/1980 |
| DE | 196 45 430 | | 5/1998 |
| EP | 0 031 236 | * | 7/1981 |
| EP | 0 145 235 | | 6/1985 |
| EP | 0 279 456 | | 8/1988 |
| EP | 0 341 012 | | 11/1989 |
| EP | 0 471 248 | | 2/1992 |
| EP | 0 481 297 | | 4/1992 |
| EP | 0 602 863 | | 6/1994 |
| EP | 0 604 408 | | 6/1994 |
| EP | 0 628 575 | | 12/1994 |
| EP | 0 671 419 | | 9/1995 |
| EP | 0 807 641 | | 11/1997 |
| GB | 2 007 234 | | 5/1979 |
| WO | WO 99/31151 | | 6/1999 |

* cited by examiner

*Primary Examiner*—Ling-Sui Choi
(74) *Attorney, Agent, or Firm*—Nixon & Vanderhye P.C.

(57) ABSTRACT

The invention describes polyisobutenyl derivatives of succinic acid obtainable by: i) reacting a polyisobutene which has a reactive end group content of at least 80% and whose molecular weight distribution is characterized by a maximum $M_P$ in the distribution curve in the range from 500 to 20 000 daltons and a ratio of weight average molecular weight to number average molecular weight $M_W/M_N$ of below 1.4 with maleic acid or maleic anhydride; ii) reacting the polyisobutene-succinic acid derivative obtained in i) with at least one compound I which has at least one primary or secondary amino group and/or an OH group to form an amide or ester bond, and also a process for preparing them and their use as additives in lubricant compositions.

16 Claims, No Drawings

POLYISOBUTENE AND POLYISOBUTENE DERIVATIVES FOR USE IN LUBRICANT COMPOSITIONS

This application is the US national phase of international application PCT/EP02/14486 filed 18 Dec. 2002 which designated the U.S. and claims benefit of DE 101 62 567.7, dated 19 Dec. 2001, the entire content of which is hereby incorporated by reference.

The present invention relates to the use of polyisobutenes in lubricant compositions and also to novel functionalized derivatives of polyisobutenes whose polyisobutene radicals are characterized by a molecular weight distribution having a polydispersity $M_W/M_N$ of less than 1.4, to a process for preparing them and to the use of the polyisobutene derivatives as lubricant additives.

Derivatives of polyisobutene which are obtainable by successive reaction of highly reative polyisobutene (PIB) with maleic anhydride (MA) and subsequent reaction of the reaction product obtained with alcohols, amines or aminoalcohols, also referred to in the following as polyisobutenyl derivatives of succinic acid or PIBSAs for short, are used in lubricant compositions as dispersants for solid particles such as soot (see, for example, DE-A 27 02 604 and EP 602 863). These dispersants customarily have polyisobutenyl radicals having an average molecular weight in the range from 500 to 20 000 daltons.

It will be appreciated that the polyisobutene used in preparing the polyisobutene derivatives has to have a sufficient reactivity for the reaction with MA. In the reaction of PIB with MA, the olefinic end groups of the formulae (A) and (B) in particular are accessible for reaction with MA, and the groups of the formula A have the highest reactivity.

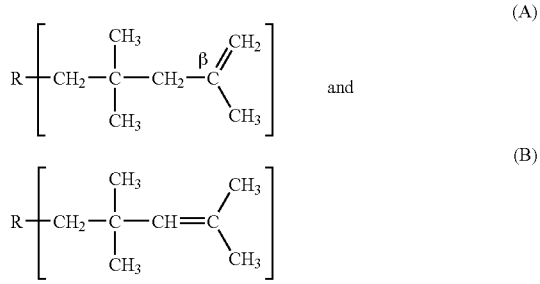

For this reason, polyisobutenes having an olefinic end group (groups of the formulae A and B) content of at least 80%, and in particular having a high proportion of end groups A, are desirable.

The prior art teaches the preparation of olefin-terminated polyisobutenes by cationic polymerization of isobutene or isobutenic hydrocarbon streams in the presence of boron trifluoride complex catalysts (see, for example, DE-A 27 02 604, EP-A 145 235, EP-A 481 297, EP 671 419, EP-A 628 575, EP-A 807 641 and WO 99/31151). The polyisobutenes obtained in this manner have a high olefinically unsaturated end group content, in particular end groups of the general formula (A).

However, the polyisobutene derivatives prepared by functionalizing the abovementioned polyisobutenes do not have satisfactory dispersion and viscosity behavior. In particular, products having good dispersancy frequently have poor viscometric properties. The dispersancy may be improved by increasing the molecular weight of the polyisobutene radical or compensated for by increased additive quantities. However, this results in a viscosity increase which is undesirable in particular at low temperatures, for example with regard to the use of dispersants in fuel economy oils.

It is an object of the present invention to provide dispersants based on polyisobutenes for lubricant compositions which simultaneously have high dispersancy and improved viscosity behavior.

In-house investigations have shown that the moderate viscosity behavior of conventional polyisobutene derivatives and their moderate dispersancy can be attributed to comparatively high molecular nonuniformity of the polyisobutene radicals. In other words, the broad molecular weight distribution of the polyisobutene radicals of these derivatives means that polyisobutenes having good dispersancy, i.e. a relatively high average molecular weight, contain a high proportion of high molecular weight products which has a disadvantageous effect on the viscosity behavior, while the polyisobutene derivatives having advantageous viscosity behavior, i.e. a low average molecular weight, contain a high proportion of short-chain products having unsatisfactory dispersancy (dispersion stability), so that to achieve sufficient dispersancy, relatively large additive quantities are required, which has the above-described disadvantages.

The processes disclosed by the prior art cited at the outset deliver polyisobutenes having a high proportion of reactive end groups. However, the products obtained still have comparatively high proportions of high molecular weight products. The molar mass distribution of these polyisobutenes is accordingly characterized by polydispersity values (=ratio of weight average molecular weight to number average molecular weight) $M_W/M_N$ of above 1.6.

Polyisobutene derivatives having a relatively narrow molecular weight distribution of the polyisobutene radicals may in principle be prepared by "living" cationic polymerization of isobutene, see, for example, Kennedy and Ivan "Carbocationic Macromolecular Engineering", Hanser Publishers 1992, and also U.S. Pat. No. 5,169,914. A living cationic polymerization is the polymerization of olefins in the presence of an initiator system which comprises a compound suitable for forming carbocations, for example a benzyl halide or a tert-alkyl halide or a corresponding benzyl or alkyl ether or ester, as the initiator and a Lewis acid as the coinitiator. The polyisobutene derivatives obtained in this manner generally have a halogen atom as the end group and are accordingly unsuitable for preparing polyisobutene derivatives.

Further in-house investigations have shown that polyisobutenes having a high olefinic end group content of more than 80 mol % and a low polydispersity may be prepared by "living" cationic polymerization when isobutene is polymerized in the presence of an initiator system which comprises at least one Lewis-acidic metal chloride or semimetal chloride and at least one compound II having at least one functional group FG which forms a carbocation or a cationic complex under polymerization conditions and is selected from halogen, acyloxy and alkoxy which are bonded to a secondary or tertiary aliphatic carbon atom, to an allylic or to a benzylic carbon atom, in a solvent which is inert toward the Lewis acid at a molar ratio of Lewis acid to compound II in the range from 1:1 to 1:100. This process also forms part of the subject-matter of the previous German patent applications P 10061727.1 and P 10061751.8.

The high olefinic end group content of the polyisobutenes prepared in this manner and their relatively high molecular uniformity, characterized by a distribution curve having a polydispersity $M_W/M_N$ below 1.4, makes it possible to prepare the derivatives of polyisobutene according to the invention.

The present invention accordingly relates to polyisobutenyl derivatives of succinic acid which are obtainable by:
  i) reacting a polyisobutene which has a reactive end group content of at least 80% and whose molecular weight distribution is characterized by a maximum $M_P$ in the distribution curve in the range from 500 to 20 000 daltons and a ratio of weight average molecular weight to number average molecular weight $M_W/M_N$ of below 1.4 with maleic acid or maleic anhydride;
  ii) reacting the polyisobutene-succinic acid derivative obtained in i) with at least one compound I which has at least one primary or secondary amino group and/or an OH group to form an amide, imide or ester bond.

The invention further relates to a process for preparing polyisobutene-succinic acid derivatives which comprises the preparation of a polyisobutene having a polydispersity $M_W/M_N<1.4$ as described above followed by steps i) and ii).

Polyisobutenyl radicals are those organic hydrocarbon radicals which are composed predominantly, preferably of 80 mol % and in particular of 90 mol %, of repeating units of the formula [—$CH_2$—$C(CH_3)_2$]—.

Preference is given to those polyisobutenes having a polydispersity $M_W/M_N$ of up to 1.3 and particular up to 1.2. With regard to use as dispersants, preference is given to those polyisobutene derivatives whose molecular weight distribution has a maximum $M_P$ in the range from 1 000 to 15 000 and in particular in the range from 1 500 to 5 000. The number average molecular weight $M_N$ is in comparable ranges.

In principle, useful compounds I include all alcohols, amines and aminoalcohols which have at least one primary or secondary amino group. With regard to the dispersing activity of the polyisobutene-succinic acid derivatives according to the invention, preferred compounds I include alcohols, amines and aminoalcohols which have exclusively saturated aliphatic or saturated cycloaliphatic structural units. Preference is given to aminoalcohols and amines which have at least one primary amino group. In addition to the at least one functional group required for the reaction of the PIB reaction product with MA, the compounds I preferably have at least one further, polar, nonionic functional group, for example a further amino group or OH group and/or ether and/or imino group. The molecular weight of the compounds I is preferably in the range from 50 to 2 000 daltons.

Particularly preferred compounds I have at least two and in particular exactly two primary amino groups and optionally further polar groups selected from secondary amino groups, imino groups, OH functions and ether groups.

Examples of preferred amines and aminoalcohols are: alkylene-diamines such as ethylene-1,2-diamine, propylene-1,2-diamine, propylene-1,3-diamine, butylenediamines, the monoalkyl, dialkyl and trialkyl derivatives of these amines, for example N,N-dimethylpropylene-1,3-diamine, and also alkanolamines such as ethanolamine and 3-aminopropanol. Monoalkylamines and alkylenediamines where the alkyl or alkylene radicals are interrupted by one or more nonadjacent oxygen atoms and may optionally also have hydroxyl groups or further amino groups such as 4,7-dioxadecane-1,10-diamine, 2-(2-aminoethoxy)ethanol and N-(2-aminoethyl) ethanolamine are likewise suitable. Further examples include N-amino-$C_1$–$C_6$-alkylpiperazines such as 4-(2-aminoethyl)piperazine. Ethoxylated and/or propoxylated derivatives of these amines and aminoalcohols are also suitable.

Useful alcohols are in particular di- or polyols preferably having from 2 to 5 hydroxyl groups, for example glycol, glycerol, diglycerol, triglycerol, trimethylolpropane, pentaerythritol and also ethoxylated and/or propoxylated derivatives of these di- and polyols. Particularly preferred compounds I are the amines of the general formula Ia

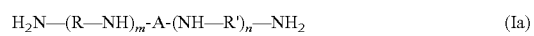

$$H_2N-(R-NH)_m-A-(NH-R')_n-NH_2 \quad\quad (Ia)$$

where
  A is $C_2$–$C_{20}$-alkylene which may be interrupted by one or more nonadjacent oxygen atoms or is $C_5$–$C_{20}$-cycloalkylene;
  R, R' are each independently $C_2$–$C_4$-alkylene and
  n, m are each independently from 0 to 5.

$C_2$–$C_{20}$-Alkylene is a divalent linear or branched alkyl group having from 2 to 20 carbon atoms and the two free valences are preferably on different carbon atoms. $C_2$–$C_4$-Alkylene is accordingly, for example, 1,2-ethylene, or 1,2- or 1,3-propylene. $C_2$–$C_{20}$-Alkylene is therefore any of the groups mentioned for $C_2$–$C_3$-alkylene or, for example, butane-1,2-diyl, -2,3-diyl, -1,3-diyl or -1,4-diyl, pentane-1,2-diyl, -2,3-diyl, -1,3-diyl, -1,4-diyl, -2,4-diyl or -1,5-diyl, hexane-1,6-diyl, 2,2,4-trimethylpentane-1,4-diyl, octane-1,8-diyl, etc. In the alkylene groups, one or two carbon atoms may also be replaced by oxygen atoms which are adjacent neither to each other nor to the linkage sites. Such alkylene groups generally have from 5 to 20 carbon atoms. Examples thereof are: 3-oxapentane-1,5-diyl, 3-oxahexane-1,6-diyl, 4-oxaheptane-1,7-diyl, 3,6-dioxaoctane-1,8-diyl, 3,7-dioxanonane-1,9-diyl, 4,7-dioxadecane-1,10-diyl, 4,8-dioxaundecane-1,11-diyl, 4,9-dioxadodecane-1,12-diyl and 4,11-dioxatetradecane-1,14-diyl.

$C_5$–$C_{20}$-Cycloalkylene is a divalent mono- or bicycloaliphatic radical preferably having from 5 to 20 carbon atoms. Examples thereof are cyclopentane-1,2- and -1,3-diyl, cyclohexane-1,2-diyl, -1,3-diyl and 1,4-diyl, cycloheptane-1,2-diyl, -1,3-diyl and 1,4-diyl, norbornane-2,3-diyl and 2,2-bis(cyclo-hexyl-4'-yl)propane.

Among the amines Ia, preference is given to those compounds where A is $C_2$–$C_4$-alkylene. R and R' are preferably 1,2-ethylene or 1,3-propylene. The sum m+n preferably has a value from 1 to 10 and in particular from 2 to 6. Examples of such amines are diethylenetriamine, triethylenetetramine, tetraethylenepentamine, N,N'-bis(3-aminopropyl)ethylenediamine, 1,5-bis(3-aminopropylamino)-3-iminopentane and 1,8-bis(3-aminopropylamino)3,6-bis-iminooctane.

The polyisobutene having a reactive end group content of at least 80% and a molecular weight distribution which is characterized by a maximum $M_P$ in the range from 500 to 20 000 daltons and a ratio $M_W/M_N$ of <1.4 is prepared according to the invention by a living cationic polymerization process, as described, for example, in the previous German patent applications P 10061727.1 and P 10061751.8 which are fully incorporated herein by way of reference.

In the process according to the invention, the polymerization of isobutene is initiated by the initiator system comprising a Lewis acid and at least one compound II. It is assumed that the Lewis acid forms a carbocation or at least an ionic complex with the compound II or polarizes the bond between the functional group FG and the carbon atom to which it is bonded so that there is an interaction with the olefinically unsaturated double bond of isobutene which generates a positive (partial) charge on the tertiary carbon atom of isobutene. This in turn interacts with a further isobutene molecule to continue the polymerization reaction.

The terms "carbocation" and "cationic complex" are not strictly divided from each other, but instead include all intermediate stages of solvent-separated ions, solvent-separated ion pairs, contact ion pairs and strongly polarized complexes having positive partial charge on one carbon atom of compound II.

Compound II is also referred to hereinbelow as the initiator and the Lewis acid as the coinitiator.

Examples of useful Lewis acids include the (semi)metal chlorides $BCl_3$, $TiCl_4$, $VCl_5$, $SnCl_4$ and $FeCl_3$. Preferred (semi)metal chlorides are $BCl_3$ and in particular $TiCl_4$.

Preference is given to those compounds II where the functional group FG has the general formula

(FG)

where
  X is selected from halogen, $C_1$–$C_6$-alkoxy and $C_1$–$C_6$-acyloxy,
  $R^1$ is hydrogen or methyl and
  $R^2$ is methyl, or forms a $C_5$–$C_6$-cycloalkyl ring with $R^1$ or with the part of the molecule to which the functional group FG is bonded, and $R^2$ may also be hydrogen when the functional group FG is bonded to an aromatic or olefinically unsaturated carbon atom.

The compounds of the general formula II preferably have one, two, three or four, in particular one or two, and more preferably one, functional group FG. X in the formula (FG) is preferably a halogen atom, in particular chlorine.

Preferred compounds II correspond, for example, to the general formulae II-A to II-D:

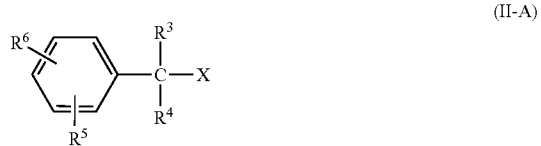
(II-A)

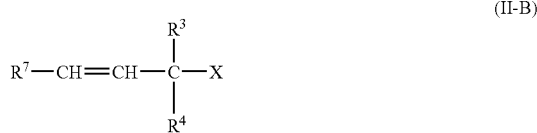
(II-B)

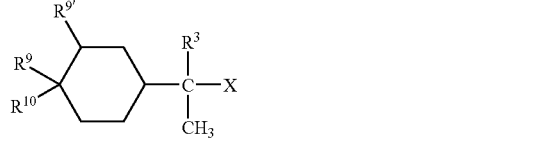
(II-C)

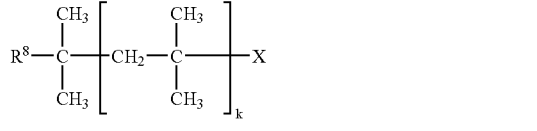
(II-D)

where X is as defined above, k is from 0 to 10,
$R^3$, $R^4$ and $R^{10}$ are each independently hydrogen or methyl,
$R^5$, $R^6$ and $R^7$ are each independently hydrogen, $C_1$–$C_4$-alkyl or a $CR^3R^4$—X group where $R^3$, $R^4$ and X are each as defined above and
$R^8$ is hydrogen, methyl or an X group and
$R^9$ and $R^{9'}$ are each hydrogen or an X group.

In the formulae II-A to II-D, $R^3$ and $R^4$ are preferably both methyl. In formula II-A, $R^6$ is, for example, a $CR^3R^4$—X group which is in the para-position to the $CR^3R^4X$ group when $R^5$ is hydrogen. It may also be in the meta-position when the $R^5$ group is $C_1$–$C_4$-alkyl or a $CR^3R^4$—X group. Examples of preferred compounds II-A are 2-chloro-2-phenylpropane and also 1,3- and 1,4-bis(2-chloro-2-propyl)benzene.

In formula II-B, $R^7$ is preferably a $CR^3R^4$—X group or hydrogen. Examples of compounds of the formula II-B are allyl chloride, methallyl chloride, 2-chloro-2-methyl-2-butene and also 2,5-dichloro-2,5-dimethyl-3-hexene.

In the compounds II-C, $R^3$ is preferably methyl. $R^2$ is preferably likewise methyl. $R^9$ is preferably an X group and in particular halogen, in particular when $R^{10}$ is methyl. Examples of compounds of the general formula II-C are 1,8-dichloro-4-p-menthane (limonene dihydrochloride), 1,8-dibromo-4-p-menthane (limonene dihydrobromide), 1-(1-chloroethyl)-3-chlorocyclohexane, 1-(1-chloroethyl)-4-chlorocyclohexane, 1-(1-bromoethyl)-3-bromocyclohexane and 1-(1-bromoethyl)-4-bromocyclohexane.

Among the compounds of the formula II-D, preference is given to those where $R^8$ is a methyl group. Among the compounds of the formula II-D, preference is given to those compounds where k is 1, 2, 3 or 4. FG is preferably halogen and in particular chlorine. With regard to the use of the polyisobutene derivatives as dispersants, preference is given to the compounds II-D.

In general, the polyisobutenes which are intended for further processing to the PIB derivatives according to the invention will be prepared using the compound II in a quantity of at least $10^{-3}$ mol per mole of isobutene, preferably in the range from $5 \times 10^{-3}$ to 0.2 mol per mole, and in particular in the range from 0.01 to 0.1 mol per mole, of isobutene. It needs to be taken into account that the molecular weight achieved of the polyisobutene prepared by the process according to the invention depends on the amount of compound II such that the molecular weight of the polyisobutene decreases with the increasing amount of compound II, based on isobutene.

It will be appreciated that the Lewis acid is used for preparing the polyisobutenes in the process according to the invention in an amount which is sufficient to form the initiator complex. In general, this is already achieved at low concentrations of the Lewis acid in the reaction medium, generally at least 0.01 mol/l. In general, the Lewis acid in the reaction medium will accordingly not exceed a concentration of 3 mol/l, preferably 2 mol/l and more preferably 1 mol/l. In particular, the concentration is in the range from 0.1 to 2 mol/l and more preferably in the range from 0.2 to 1 mol/l.

The molar ratio of Lewis acid to compound II will preferably not exceed a value of 1:1 and is in particular in the range from 1:1.2 to 1:10.

In addition to the compounds II, the initiator system preferably comprises at least one further aprotic polar compound III which is suitable for complexing with the Lewis acid or with the carbocation or ionic complex of the Lewis acid and compound II formed under the reaction condtiions.

The compound III is a Lewis base (electron donor) which has at least one free electron pair on at least one heteroatom which is selected from, for example, oxygen, nitrogen, phosphorus and sulfur atoms.

Examples of such donor compounds III are pyridines such as pyridine and substituted pyridines, in particular sterically hindered pyridines, and also N,N-dialkylamides of aliphatic or aromatic carboxylic acids such as N,N-dimethylacetamide, N-alkyl lactams such as N-methylpyrrolidone, dialkyl ethers such as diethyl ether and diisopropyl ether, cyclic ethers such as tetrahydrofuran, trialkylamines such as triethylamine, $C_1$–$C_4$-alkyl esters of aliphatic $C_1$–$C_6$-carboxylic acids such as ethyl acetate, dialkyl thioethers or alkyl aryl thioethers such as methyl phenyl sulfide, dialkyl sulfoxides such as dimethyl sulfoxide, alkylnitriles such as acetonitrile and propionitrile, trialkylphosphines or triarylphosphines such as trimethylphosphine, triethylphosphine, tri-n-butylphosphine and triphenylphosphine, and nonpolymerizable, aprotic organosilicon compounds which have at least one organic radical bonded via oxygen. This radical generally has from 1 to 20 carbon atoms. Examples of such radicals are alkyloxy, cycloalkyloxy, aryloxy, arylalkyloxy and acyloxy (=alkylcarbonyloxy).

Among the abovementioned donors, preference is given to pyridine and sterically hindered pyridine derivatives and also in particular organosilicon compounds. In a particularly preferred embodiment, the donor used is at least one organosilicon compound.

Sterically hindered pyridines are those which have sterically demanding alkyl groups at least in the 2- and 6-positions of the pyridine ring, for example 2,6-diisopropylpyridine and 2,6-di-tert-butylpyridine.

Preference is given to using the donor III and in particular the organosilicon compound in such an amount that the molar ratio of donor molecules III to the metal atoms or the semimetal atoms in the Lewis acid is in the range from 1:1 000 to 1:1, preferably in the range from 1:500 to 1:1.5 and more preferably in the range from 1:200 to 1:2.

The organosilicon compounds suitable as donor III may have one or more, for example 2 or 3, silicon atoms with at least one organic radical bonded via oxygen. Preference is given to those organosilicon compounds which have one, two or three, and in particular 2 or 3, organic radicals bonded via oxygen per silicon atom.

Preferred organosilicon compounds are those which have the general formula IIIa:

$$R^a{}_n Si(OR^b)_{4-n} \quad \text{(IIIa)}$$

where n is 1, 2 or 3,
each $R^a$ may be identical or different and may each independently be $C_1$–$C_{20}$-alkyl, $C_5$–$C_7$-cycloalkyl, aryl or aryl-$C_1$–$C_4$-alkyl, and the latter three radicals may also have one more more $C_1$–$C_{10}$-alkyl groups as substituents, and
each $R^b$ is identical or different and is $C_1$–$C_{20}$-alkyl or, when n=1 or 2, two different $R^b$ radicals may also form a 2- or 3-membered alkylene unit.

In formula IIIa, the variable n is preferably 1 or 2. The variable $R^a$ is preferably a $C_1$–$C_8$-alkyl group and in particular an alkyl group which is branched or bonded via a secondary carbon atom, such as isopropyl, isobutyl, 2-butyl or a 5-, 6- or 7-membered cycloalkyl group. The variable $R^2$ is preferably a $C_1$–$C_4$-alkyl group.

Examples of such preferred compounds are dimethoxydiisopropylsilane, dimethoxyisobutylisopropylsilane, dimethoxydiisobutylsilane, dimethoxydicyclopentylsilane, dimethoxyisobutyl-2-butylsilane, diethoxyisobutylisopropylsilane, triethoxytoluylsilane and triethoxybenzylsilane.

Useful isobutene feedstocks for the process according to the invention are both isobutene itself and also isobutenic $C_4$-hydrocarbon streams, for example $C_4$-raffinates, $C_4$-cuts from isobutane dehydrogenation, and $C_4$-cuts from steam crackers and FCC crackers (FCC: Fluid Catalyzed Cracking), as long as they have been substantially freed of 1,3-butadiene contained therein. $C_4$-Hydrocarbon streams suitable according to the invention generally comprise less than 5 000 ppm, preferably less than 2 000 ppm, of butadiene. When $C_4$-cuts are used as starting materials, the hydrocarbons other than isobutene assume the role of an inert solvent.

Useful solvents include all low molecular weight organic compounds which are different to compounds II and III and also to isobutene, have no abstractable protons and are liquid under the polymerization conditions, optionally as a mixture of solvents. Preferred solvents are hydrocarbons, for example acyclic alkanes having from 2 to 8, and preferably from 3 to 6, carbon atoms such as ethane, iso- and n-propane, n-butane and its isomers, n-pentane and its isomers, n-hexane and its isomers and also n-heptane and its isomers, cyclic alkanes having from 5 to 8 carbon atoms such as cyclopentane, cyclohexane and cycloheptane, acyclic alkenes preferably having from 2 to 8 carbon atoms such as ethene, iso- and n-propene, n-butene, n-pentene, n-hexene and n-heptene, cyclic olefins such as cyclopentene, cyclohexene and cycloheptene, aromatic hydrocarbons such as toluene, xylene and ethylbenzene, and also halogenated hydrocarbons, for example halogenated alkanes having from 1 to 5 carbon atoms and 1, 2, 3, 4, 5 or 6 halogen atoms selected from fluorine and in particular chlorine, such as methyl chloride, dichloromethane, trichloromethane, ethyl chloride, 1,2-dichloroethane and 1,1,1-trichloroethane and also chloroform and haloaromatics such as chlorobenzene.

Not only the solvents alone, but also mixtures of these solvents are suitable. Preference is given to mixtures in particular when the solvent has a melting point above the desired polymerization temperature.

Particular preference is given to solvents and solvent mixtures which comprise at least one hydrocarbon. Among these, particular preference is given to solvent mixtures which comprise at least one hydrocarbon and at least one haloalkane. Among these, particular preference is given to solvent mixtures which comprise at least one acyclic alkane having from 4 to 6 carbon atoms, in partiuclar hexane, and at least one chloroalkane, in particular methyl chloride or methylene chloride. Particular preference is likewise given to solvent mixtures which comprise at least one aromatic hydrocarbon, in particular toluene, and at least one chloroalkane, in particular methyl chloride or methylene chloride. The volume ratio of hydrocarbon to halogenated hydrocarbon is preferably in the range from 1:10 to 10:1, in particular in the range from 4:1 to 1:4. It will be appreciated that the chloroalkanes in these mixtures comprise no compounds in which chlorine atoms are attached to secondary or tertiary carbon atoms. Particular preference is likewise given to ternary solvent mixtures which comprise at least one aromatic hydrocarbon, in particular toluene, at least one acyclic alkane having from 4 to 6 carbon atoms, in particular hexane, and at least one chloroalkane, in particular methyl chloride or methylene chloride. The volume ratio of the three components mentioned is selected in such a manner that the ratio of alkane to aromatic is in the range from 1:10 to 10:1 and the volume ratio of alkane+aromatic to haloalkane is in the range from 10:1 to 1:1. When the polymerization is carried out with evaporative cooling, the solvent or solvent mixtures then also contain up to 50% by volume, for example from 5 to 50% by volume, preferably from 10 to 30% by volume, of a volatile solvent component, for example ethylene.

It will be appreciated that the polymerization is carried out under substantially aprotic, in particular anhydrous, reaction conditions. Aprotic and anhydrous reaction conditions mean that the water content and protic impurity content respectively in the reaction mixture are less than 50 ppm and in particular less than 5 ppm. In general, the starting materials will accordingly be dried by physical and/or chemical measures before use. For example, the aliphatic or cycloaliphatic hydrocarbons preferably used as solvent after customary prepurification and predrying may be admixed with an organometallic compound, for example an organolithium, organomagnesium or organoaluminum compound in a sufficient amount to remove water traces from the solvent. The solvent treated in this manner is then condensed directly into the reaction vessel. It is also possible to proceed in a similar manner with the $\alpha$-olefins, the aromatic hydrocarbons and the monomers to be polymerized, in particular the isobutene.

The solvents and the isobutene are prepurified and predried in a customary manner, preferably by treating with solid drying agents such as molecular sieves or predried oxides such as calcium oxide or barium oxide. A similar method may be used to dry the starting materials for which treatment with metal alkyls is unsuitable, for example the alkyl halides used as solvent and also compounds II and III.

In general, the process according to the invention will be carried out at temperatures below room temperature (25° C.) and preferably below 0° C., for example in the range from 0 to –140° C., preferably in the range from –30 to –120° C., and more preferably in the range from –40 to –110° C. In general, the greater the purity of the reactants used, the higher the possible reaction temperatures. The reaction pressure is of minor importance and depends in a known manner on the apparatus used and other reaction conditions.

The isobutene or isobutenic starting material polymerizes spontaneously when the initiator system used according to the invention is mixed with the isobutene or isobutenic starting material in the inert organic solvent at the desired reaction temperature. A possible procedure is to initially charge isobutene in the inert solvent, cool it to reaction temperature and then add the initiator system. Another possible procedure is to initially charge the initiator system in the solvent and then add the isobutene or isobutenic feedstock, either all at once or at its rate of consumption. Also, a portion or the entire amount of the isobutene or isobutenic feedstock may be initially charged in the solvent and then the initiator system added. The remaining amounts of isobutene or isobutenic feedstock are then introduced in the course of the reaction, for example at the rate of their consumption. When the initiator system is added, the procedure will generally be to add the components of the initiator system separately. In the batchwise method described here, the procedure will generally be to first add the initiator compound II and any compound III and then the Lewis acid (coinitiator). The initiation time is the time at which both components of the initiator system are contained in the reaction vessel. An example of a possible procedure is to initially charge the solvent, then compound II and any donor III and then a portion or the entire amount of the isobutene or isobutenic feedstock, and then to introduce any remaining amount of isobutene or isobutenic feedstock to the polymerization. However, it is also possible to initially charge first the solvent, then the Lewis acid and a portion or the entire amount of isobutene or isobutenic feedstock and then start the polymerization by adding compound II and any compound III. Preference is given to adding the coinitiator into a reaction vessel which already contains isobutene and any comonomers, and then further amounts of isobutene and any Lewis acid may also be added under polymerization conditions in the course of the polymerization reaction (in general, also referred to as incremental monomer addition).

As well as the above-described batchwise procedure, the polymerization may also be configured as a continuous process. The feedstocks, i.e. the monomers to be polymerized, the solvent and also the initiator system of the polymerization reaction, are added continuously and the reaction product is withdrawn continuously, so that more or less stationary polymerization conditions are maintained in the reactor. The components of the initiator system may be introduced either separately or else together, preferably diluted in the solvent. The isobutene or isobutenic feedstocks to be polymerized may be added alone, diluted with a solvent or as an isobutenic hydrocarbon stream. For example, the components of the initiator system diluted in the solvent may be added via multicomponent jets in order to achieve good mixing of the components.

The heat of reaction in both the batchwise and continuous reaction procedure is removed in a customary manner, for example using internally installed heat exchangers and/or by wall cooling and/or by utilizing evaporative cooling. The use in particular of ethene and/or mixtures of ethene with other hydrocarbons and/or halogenated hydrocarbons as solvent has proven useful, since ethene is not only inexpensive, but also has a boiling point in the desired polymerization temperature range.

Useful reaction vessels for carrying out the process according to the invention include in principle all reactors that are customarily used in cationic polymerization of isobutene, for example cationic polymerization of isobutene using boron trifluoride-oxygen complexes. In this regard, reference is hereby made to the relevant prior art. When the reaction is carried out batchwise, useful reactors include the customary stirred tanks which are preferably equiped with evaporative cooling, suitable mixers, feeds, heat exchanger elements and inertization devices. The continuous reaction may be carried out in customary reaction tanks, reaction batteries, tubular reactors, tube bundle reactors, and in particular circular or helical tubular and tube bundle reactors which have preferably been equipped in the manner described above for reaction tanks.

Useful reactors for the continuous preparation of polyisobutenes are in particular tubular reactors. Among these, preference is given to those in which very little backmixing takes place, since particularly narrow molecular weight distributions are obtained. The use of a spiral flow reactor, also referred to as a spiral tubular reactor, with appropriate helical winding avoiding differing flow rates in the center region and in the wall region of the tube (flow profile), is ideal. The installation of static mixers or similar internals allows good mixing and in particular good heat removal to be achieved, even when the flow is laminar.

To recover the polyisobutenes from the reaction mixture, it is deactivated after the polymerization in the manner customary for cationic polymerization reactions, preferably by adding a protic compound, in particular by adding alcohols such as methanol, ethanol, n-propanol, isopropanol, n-butanol, isobutanol, sec-butanol or tert-butanol, or mixtures thereof with water. Preference is given to adding the substances used for deactivation in a diluent, for example one of the abovementioned solvents, in order to avoid an undesired viscosity increase. Reference is also hereby made to the prior art for polymerizing boron trifluoride with isobutene cited at the outset whose workup measures may be applied in a similar manner to the process according to the invention.

Preference is given to cooling the means used for deactivation or the mixture thereof with an inert solvent to the polymerization temperature before the deactivation, in order to avoid undesired secondary reactions. Thereafter, the mixture will generally be heated to temperatures above 0° C. and the reaction mixture washed with water or methanol or a mixture thereof. After removal of aqueous components, the mixture is optionally dried.

In general, the solvents are then removed in suitable units, for example in rotation, falling film or thin film evaporators, or by flash evaporation (depressurization of the reaction solution downstream of a tube bundle heat exchanger in tube lines or using a perforated jet plate). In general, reduced pressure, for example in the range from 0.1 to 800 mbar, preferably from 1 to 100 mbar, will be applied to remove the solvent. The bottom temperature is preferably from 50 to 250° C. and in particular from 150 to 230° C. The use of elevated temperatures, for example above 150° C., in particular 170° C. or higher, leads to a further reduction in the residual chlorine contents and accordingly to an increased proportion of terminal double bonds in the reaction product.

The polyisobutenes prepared in this manner have a high content of olefinically unsaturated end groups of the general formula (A) and/or (B). The end group content is generally at least 80 mol %, in particular at least 90 mol % and more preferably at least 95 mol %, based on the polymer chains. The polyisobutenes prepared in this manner have a narrow molecular weight distribution which is characterized by a polydispersity $D=M_W/M_N$ of below 1.4, preferably below 1.3, and in particular below 1.2, for example in the range from 1.05 to 1.2.

Advantageously, the polyisobutenes obtained in this manner are notable, as well as for the low polydispersity, in that the maximum of the molecular weight distribution $M_p$ is less than 10% above the value of the number average molecular weight. In many cases, the peak maximum $M_p$ is even less than 8% or even less than 6% above the value of the number average molecular weight.

All molecular weights quoted refer to values as determined by means of gel permeation chromatography (GPC). The gel permeation chromatography was effected using THF as the eluent and $CS_2$ as the reference in two columns attached in series (L=300 mm, d=7.8 mm), the first of which was packed with Styragel HR5 (molecular weight ratio 50 000 to $4\times10^6$) and the second of which was packed with styragel HR3 (molecular weight range 200 to 30 000) from Waters. The detection was effected using a differential refractometer. The standards used for determining the isobutene block were commercial polyisobutene standards in the molar mass range from 224 to 1 000 000 from Polymer-Standards Service, Mainz. The elution diagrams were evaluated with regard to the polydispersity $M_W/M_N$ in such a manner that the reference value of 1.7 was obtained for commercial polyisobutene of molar mass 1 000 (Glissopal® 1000 from BASF-Aktiengesellschaft).

The polyisobutenes obtained in this manner may then be reacted successively in a known manner with maleic anhydride and then with the alcohol, amine or aminoalcohol or a mixture thereof. Processes for this purpose are disclosed by, for example, DE-A 27 02 604, U.S. Pat. No. 4,152,499, U.S. Pat. No. 5,137,980 and also DE-A 43 19 672 which are explicitly incorporated herein by way of reference.

To this end, the polyisobutene is reacted thermally in a first step in a manner known per se with maleic anhydride. Maleic anhydride and polyisobutene are generally reacted with each other in a molar ratio in the range from 0.7:1 to 4.0:1, preferably from 0.8:1 to 2.5:1 and in particular from 0.9:1 to 1:1.5. Excess unconverted maleic anhydride may optionally be removed from the reaction mixture after the end of the reaction extractively or distillatively, for example by stripping with inert gas at elevated temperaute and/or reduced pressure.

The reaction is generally carried out at a temperature in the range from 100 to 300° C., preferably from 120 to 270° C. and in particular from 150 to 250° C. The reaction time is generally from 50 minutes to 20 hours and preferably in the range from 1 to 6 hours.

Preference is given to carrying out the reaction with exclusion of oxygen and water in order to avoid undesired secondary reactions. However, the degree of conversion in the presence of air or a few ppm of halogen such as bromine may be higher than under inert conditions. The reaction will accordingly preferably be carried out using appropriately purified reactants and in an inert gas atmosphere, for example under dried nitrogen, since the low extent of by-product formation allows the omission of a subsequent filtration step.

If desired, the reaction may be carried out in a solvent which is inert under the reaction conditions, for example in order to achieve a suitable viscosity of the reaction mixture or in order to avoid crystallization of maleic anhydride on cold spots of the reactor. Examples of useful solvents are aliphatic hydrocarbons and mixtures thereof, for example those mentioned above, in particular paraffins and oils having a boiling point above the reaction temperature and also aromatic hydrocarbons and halogenated hydrocarbons such as toluene, xylene, isopropylbenzene, chlorobenzene and dichlorobenzene, and also mixtures of the abovementioned solvents.

The polyisobutene functionalized in the first step with maleic anhydride PIB-MA is then reacted with the compound I, generally in a molar ratio of PIB-MA to compound I in the range from 0.4:1 to 4:1 and preferably from 0.5:1 to 3:1. In compounds having only one primary or secondary amino group, at least equimolar quantities of amine will frequently be used.

When the preferred primary amines are used, the reaction with the maleic anhydride group of the functionalized polyisobutene may also form amide and/or imide structures, and the reaction conditions are preferably selected in such a manner that imide structures are formed, since the products obtained are preferred owing to their better application properties.

Particularly preferred amines having at least two, preferably primary, amino groups are able to form bisamides or bisimides which are particularly preferred according to the invention. To prepare the bisimides, the amine will preferably be used in approximately the desired stoichiometry. Preference is given to using these diamines in an amount of less than 1 mol, in particular in an amount of from 0.3 to 0.95 mol and more preferably in an amount of from 0.4 to 0.9 mol per mole of PIB-MA.

The reaction of the polyisobutene functionalized using maleic anhydride with compound I is, depending on the reactivity of the compound I used, generally carried out at a temperature in the range from 25 to 300° C., preferably from 50 to 200° C. and in particular from 70 to 170° C., optionally using an amidation catalyst. Excess unconverted compound I may optionally be removed from the reaction mixture after the end of the reaction extractively or distillatively, for example by stripping using inert gas at elevated temperature and/or under reduced pressure. Preference is given to carrying out the reaction to a conversion of the components of at least 90% and in particular 95% (based on the components used in deficiency), and the reaction progress may be followed using the water content by means of customary analytical methods, for example via the acid number. The formation of compounds having imide structure from those having amide structure can be followed by means of IR spectrometry.

The derivatives of polyisobutene according to the invention are notable for their improved viscosity behavior at a dispersancy at least comparable to commercial products having comparable number average molecular weight. They may accordingly be used in higher concentrations than commercial dispersants without any danger of disadvantageous viscosity behavior of the lubricant, which is of interest in particular with regard to lengthened oil change intervals.

Surprisingly, even mixtures of the polyisobutenyl derivatives according to the invention which comprise a component having a relatively low molecular weight and a further component having a relatively high molecular weight lead to better application properties than a derivative obtained from a commercial polyisobutene whose weight average molecular weight $M_W$ corresponds to the average of the number average molecular weights of this mixture. Accordingly, mixtures of polyisobutenyl derivatives according to the invention likewise form part of the subject-matter of the present invention. The mass ratio of the low molecular weight to the high molecular weight components may be in the range from 1:10 to 10:1. The mixing may take place at the polyisobutene stage. However, preference is given to mixing the low molecular weight and the high molecular weight polyisobutenyl derivative, since even better application properties are then obtained.

For this reason, a further aspect of the present invention relates to the use of the polyisobutene derivatives according to the invention as additives in liquid lubricant compositions, in particular in lubricant oils for combustion engines such as Otto, Wankel, two-stroke and diesel engines and especially in fuel economy engine oils. Fuel economy engine oils are oils for combustion engines whose dynamic viscosity at −35° C. is below 60 000 mPa·s (ASTM/D 4684) and whose dynamic viscosity at −25° C. is below 3 500 mPa·s (by DIN 51377).

The polyisobutene derivatives according to the invention are generally added to the lubricants in the form of a from 50 to 60% mineral oil solution, customarily in an amount of from 0.5 to 25% by weight, preferably in an amount of from 1 to 20% by weight and in particular in a from 2 to 15% by weight solution (based on a 50% by weight solution), based on the total weight of the composition. Lubricant compositions which comprise these amounts of polyisobutene derivatives according to the invention accordingly likewise form part of the subject-matter of the present invention.

In principle, useful lubricants include all liquid lubricants (see above), preferably oils for combustion engines in motor vehicles, i.e. oils for Otto, Wankel, two-stroke and diesel engines, in particular fuel economy engine oils and especially those of viscosity classes 5 W to 20 W by DIN 51511.

The liquid lubricants may be additivized in the customary manner, i.e. as well as the base oil components typical for the application, they comprise, for example, mineral or synthetic hydrocarbons, polyethers or esters and mixtures thereof, further additives other than dispersants such as detergent additives, antioxidants, viscosity index improvers, pour point depressants, friction modifiers, defoamers, corrosion inhibitors, etc., in the customary amounts. An overview of suitable additives can be found in D. Klamann, "Lubricants and Related Products—Additives" in Ullmanns Encyclopedia of Industrial Chemistry, 5th ed. on CD-ROM, WILEY-VCH 1999.

It will be appreciated that the additives according to the invention may also be used together with other dispersing additives, and the proportion of polyisobutene derivatives according to the invention in the total quantity of dispersing additives is generally at least 30% by weight and preferably at least 60% by weight.

Surprisingly, it has been found in connection with the dispersants according to the invention that polyisobutenes having a molecular weight distribution which is characterized by a maximum $M_p$ in the range from 20 000 to 120 000 and a polydispersity $M_W/M_N$ of <1.4 provide an outstanding improvement in the viscosity behavior of liquid lubricant compositions, in particular of synthetic and/or mineral hydrocarbons, as used in combustion engines, in particular motor vehicle engines.

In particular, they lead to improve thickening at high temperatures, improved viscosity behavior at low temperatures and better shear stability of the lubricant in comparison to known viscosity index improvers (VI-improvers) based on polyisobutenes or olefin copolymers (OCP=ethene/propene copolymers).

The polyisobutenes suitable for use as VI-improvers may likewise be prepared in the above-described manner, although to obtain a relatively high molecular weight, compound II is used in relatively small amounts, preferably in an amount of from $10^{-4}$ to $10^{-2}$ mol per mole of isobutene and in particular in an amount of from $5 \times 10^{-4}$ to $5 \times 10^{-3}$ mol per mole of isobutene. The ratio of Lewis acid to compound II will, owing to the relatively low concentration of compound II, exceed the value 1:1 and may be up to 1:20. It is preferably in the range from 1:30 to 1:20. The ratio of donor III to Lewis acid is preferably in the range from 1:100 to 1:1, in particular in the range from 1:50 to 1:1.1 and more preferably in the range from 1:20 to 1:1.5. Otherwise, the same applies as was stated for preparing PIB having a molecular weight in the range from 500 to 20 000.

The PIBs obtained in this manner are characterized by a molecular weight distribution having a maximum MP in the range from >20 000 to 120 000 and a polydispersity $M_W/M_N$ of below 1.4 and may be used with or without a customary functionalization or hydrogenation of the terminal double bond as VI-improvers in liquid lubricants, in particular in the lubricants mentioned as being preferred. The PIBs lead to a viscosity behavior comparable with conventional polyisobutenyl derivatives of succinic acid at relatively low temperature, but have better shear stability. The thickening action is comparable to or frequently better than the known VI-improvers based on polyisobutenes having the same weight average molecular weight $M_W$, so that relatively small quantities are required to achieve the specification. The concentration of such PIBs in lubricants, in particular in fuel economy engine oils, is in the customary ranges, for example in the range from 0.1 to 20% by weight, in particular from 0.2 to 10% by weight and more preferably from 0.5 to 5% by weight, based on the total weight of the composition.

The invention is illustrated by the examples hereinbelow.

I. Analysis

The molecular weight ($M_N$, $M_W$) was determined in the above-described manner by means of GPC, mass spectrometry and/or by $^1H$ NMR spectroscopy. The double bond content was determined by means of $^1H$ NMR spectroscopy (integration of the vinyl protons compared to methyl and methylene protons) or via the chlorine content. The residual chlorine content was determined by elemental analysis.

II. Preparation of the Polyisobutene Derivatives

IIa. Preparation of the Polyisobutenes (Preparative Examples 1 to 3)

1. Preparation of a Polyisobutene Having an $M_n$ of 2 300

The reaction vessel used was a 2 l four-neck flask which was equipped with a dry ice condenser, a 1 l dropping funnel having a molecular sieve bed (3 Å; 500 ml; dried at 150° C./2 mbar for 16 h) and a dry ice condenser, a thermometer, a septum, a magnetic stirrer and a further 1 l dropping funnel which had a molecular sieve bed (3 Å; 300 ml; dried at 150° C. and 2 mbar for 16 h) and above it a bed of 250 ml of an acidic ion exchanger (Lewatit K 2621 from Bayer AG; dried at 150° C. and 2 mbar for 16 hours) and also a dry ice condenser. The reaction vessel was dried by evacuating it and purging it with dry nitrogen twice. A mixture of 600 ml of dried methylene chloride and 200 ml of dried hexane cooled to −78° C. was charged into the dropping funnel having the molecular sieve and ion exchanger so that the molecular sieve and ion exchanger were covered. After 15 min, the solvent mixture was added dropwise into the reaction vessel within 30 min. 448.9 g (8 mol, 750 ml) of isobutene were condensed into the other dropping funnel (having the molecular sieve) in such a manner that the isobutene was dried on a further packing of 250 ml of molecular sieve 3 Å at an average residence time of 15 min, based on the dead volume of the molecular sieve. This isobutene was added dropwise into the reaction flask within a total of 25 minutes at an average residence time on the molecular sieve in the dropping funnel of 15 minutes. 0.38 g (2 mmol) of 2,6-di-tert-butylpyridine and 45.1 g (0.22 mol) of tetraisobutenyl chloride were added with stirring via the septum and the reaction flask was cooled using dry ice to −70° C. 22.8 g (0.12 mol) of titanium tetrachloride were then added via the septum with vigorous stirring. The polymerization which then begins can be recognized by the temperature increase in the reaction vessel. After 5 minutes, the reaction was ended by adding 77 ml (1 mol) of isopropanol, the reaction mixture heated to 0° C. and washed three times with 200 ml of water each time, dried over sodium sulfate and freed of solvent at 200° C. under reduced pressure to a final pressure of 2 mbar and then treated with basic aluminum oxide.

Yield: 490 g of clear oil, $M_N$=2 300 D, $M_P$=2 350, D=1.18; viscosity at 100° C.: 1 250 mm$^2$/s; chlorine content below 12 ppm, content of olefinic end groups A: 65 mol %, end groups B: 30 mol %.

2. Preparation of a Polyisobutene Having an $M_n$ of 3 900

The reaction was carried out in a similar manner to preparative example 1, except that 200 ml of methylene chloride, 366.7 g (6 mol) of isobutene, 16.4 g (80 mmol) of tetraisobutenyl chloride and 7.6 g (40 mmol) of titanium tetrachloride were used.

Yield: 340 g of clear oil, $M_N$=3 900, $M_P$=4 100, $M_W$=4 300, D=1.19; viscosity at 100° C.: 3 200 mm$^2$/s; chlorine content below 1 ppm, content of olefinic end groups A: 65 mol %, end groups B: 28 mol %.

3. Preparation of a Polyisobutene Having an $M_n$ of 74 000

Preparative example 3 was carried out in a similar manner to preparative example 1, except that 600 ml of hexane, 200 ml of methyl chloride, 224.4 g (4 mol) of isobutene, 1.23 g (6 mmol) of tetraisobutenyl chloride and 11.4 g (60 mmol) of titanium tetrachloride were used; methyl chloride was condensed in together with isobutene and added dropwise; the reaction time was 20 hours at −78° C.

Yield: 220 g of a clear oil, $M_N$=74 000, $M_P$=80 000, D=1.11; the viscosity of a solution of 2 g of polyisobutene in 10 ml of isooctane at 20° C. was 1.30 mm$^2$/s; chlorine content 9 ppm (there was no aftertreatment using $Al_2O_3$).

IIa. Preparation of the Polyisobutene-succinic Acid Derivatives

EXAMPLE 1

400 g of the polyisobutene obtained from preparative example 1 were heated with 4 g of 2-propanol in a 1.2 l stirred autoclave equipped with a pan stirrer to 160° C. at a pressure of 10 mbar. With the vacuum lines closed, 25.5 g of liquid maleic anhydride were then metered directly onto the pan stirrer, and the mixture was heated at the same time.

When the metering in had ended, the internal temperature was 205° C., and after a further 10 min, 225° C. The autoclave contents were stirred at 225° C. for a further 4 hours, and the pressure in the reactor first decreased to 1 bar of superatmospheric pressure, then increased to 2 bar. The heating of the autoclave was then switched off and it was cautiously depressurized. Vacuum was then applied cautiously at 200° C. so that volatilizing maleic anhydride did not lead to foam overflow. In this manner, unconverted maleic anhydride was removed at 200° C. to a final vacuum of 1 mbar.

The active substance content was then determined by means of column chromatography and was 81%. The saponification number was 46 mg of KOH/g of substance. 400 g of the product obtained in this manner (0.164 mol) of polyisobutene succinic anhydride (PIBSA) were reacted with 15.53 g of tetraethylenepentamine (0.082 mol of TEPA) in a rotary evaporator at a temperature of 180° C. for 4 hours. A pressure of 1 mbar was then set for 15 minutes. A low viscosity mineral oil (SN 100) was then added in such a quantity that the concentration of the active product was 60% by weight.

EXAMPLE 2

The polyisobutene obtained from preparative example 2 was reacted in a similar manner to example 1. After the first stage, the active substance content was about 75% by weight, and the saponification number was 22 mg of KOH/g of product.

COMPARATIVE EXAMPLE 1

Commercial polyisobutene having $M_W$=1 630, $M_N$=1 000 and a polydispersity of 1.63 was reacted in a similar manner to example 1.

COMPARATIVE EXAMPLE 2

Commercial polyisobutene having $M_W$=4 370, $M_N$=2 300 and a polydispersity of 1.90 was reacted in a similar manner to example 1.

III Application Testing

1. Dispersancy

To assess the dispersancy, a spot test according to "Les Huiles pour Moteurs et la Graissage des Moteurs" by A. Schilling, 1962, Vol. 1, page 89 ff. was carried out. To this end, a diesel oil-carbon black dispersion having a 3% by weight content of the additive to be tested was prepared. A drop of the dispersion was applied to a filter paper for paper chromatography and the carbon black migration was assessed visually with reference to a scale from 0 to 1 000. The higher the value, the better the dispersancy. Table 1 shows the results.

2. Viscosity at a High Shear Rate

The viscosity at high shear rate was determined by DIN 51377. To this end, the additives of examples 1 and 2 and comparative example 1 were each mixed with a customary fuel economy oil formulation in an amount of 5% by weight, based on the formulation. The results are reported in table 1. Examples 1 and 2 achieved the specification αW-30, but the comparative examples C1 and C2 did not.

TABLE 1

| Experiment | PIB derivative Ex. | Dispersancy | Viscosity at −30° C. [mPa · s] |
|---|---|---|---|
| 1 | 1 | 665 | 3 000 |
| 2 | 2 | 685 | 3 200 |
| 3 | C2 | 635 | 3 400 |

3. Shear Stability

The shear stability of the oil was determined by measuring the viscosity loss in a Bosch nozzle by DIN 51382 (results in %, based on the starting viscosity). To this end, a fuel economy engine oil formulation 5W-40 having the polyisobutene from preparative example 3 (PIB 3) was additivized for 10W40 in accordance with the specification.

For comparative purposes, a fuel economy oil formulation was additivized for 5W-40 engine oil in accordance with the specification using either an olefin copolymer OCP (characterization) and a commercial polyisobutene (PIB C2) having a molecular weight $M_N$ of 74 000 and a polydispersity of 3.0. The amounts required in each case and results are reported in table 2.

TABLE 2

| Experiment | Polymer | Amount [% by weight] | Shear loss |
|---|---|---|---|
| 4 | PIB 3 | 1.5 | 4% |
| 5 | PIB C2 | 2.5 | 15% |
| 6 | OCP | 1.5 | 10% |

We claim:

1. A polyisobutenyl derivative of succinic acid obtained by:
   i) reacting a polyisobutene which has a reactive end group content of at least 80% and whose molecular weight distribution is characterized by a maximum $M_P$ in the distribution curve in the range from 500 to 20 000 daltons and a ratio of weight average molecular weight to number average molecular weight $M_W/M_N$ of below 1.4 with maleic acid or maleic anhydride to form a polyisobutene-succinic acid derivative; and
   ii) reacting the polyisobutene-succinic acid derivative obtained in i) with at least one compound I which has at least one primary or secondary amine group and/or an OH group to form an amide or ester bond.

2. A polyisobutenyl derivative as claimed in claim 1 where the polyisobutene has a molecular weight distribution having a maximum $M_P$ in the range from 1,500 to 15,000.

3. A polyisobutenyl derivative as claimed in claim 1 where the compound I has at least one primary amino group.

4. A polyisobutenyl derivative as claimed in claim 3 where the compound I is selected from diamines of the general formula Ia $$H_2N—(R—NH)_m\text{-}A\text{-}(NH—R')_n—NH_2 \qquad (Ia)$$

where

A is $C_2$–$C_{20}$-alkylene which may be interrupted by one or more nonadjacent oxygen atoms or is $C_5$–$C_{20}$-cycloalkylene;

R, R' are each independently $C_2$–$C_4$-alkylene and n, m are each independently from 0 to 5.

5. A lubricant composition, comprising at least a polyisobutene derivative as defined in claim 1 as an additive.

6. A lubricant composition comprising, in addition to customary additive components, at least one polyisobutene derivative as claimed in claim 1 in quantities of from 0.5 to 25% by weight, based on the total weight of the composition.

7. A lubricant composition as claimed in claim 6 in the form of a fuel economy engine oil.

8. A process for preparing a polyisobutenyl derivative which comprises the steps of:
   (I) polymerizing isobutene in the presence of an initiator system comprising
       a) a Lewis acid selected from covalent metal chlorides and semimetal chlorides,
       b) and at least one compound II having at least one functional group FG which forms a carbocation or a cationic complex under polymerization conditions and is selected from halogen, acyloxy and alkoxy which are bonded to a secondary or tertiary aliphatic carbon atom, or to an allylic carbon atom or to a benzylic carbon atom,
       in a solvent which is inert toward the Lewis acid at a molar ratio of Lewis acid to compound II in the range from 10:1 to 1:100 to obtain a polyisobutene having an olefinic end group content of at least 80 mol % whose molecular weight distribution has a maximum $M_P$ in the range from 500 to 1,000 and a polydispersity $M_W/M_N$ below 1.4, and
   (II) reacting the polyisobutene obtained in step (I) successively with maleic acid or maleic anhydride and then with a compound I which has at least one primary or secondary amine group and/or OH group.

9. A process as claimed in claim 8 where the compound II is selected from compounds of the general formula $$CH_3—C(CH_3)_2—[CH_2—C(CH_3)_2]_k—X$$

where k is 0, 1, 2, 3 or 4 and X is halogen, alkyloxy or acyloxy.

10. A process as claimed in claim 8, wherein the compound II is used in a quantity of from 0.001 to 0.3 mol per mole of isobutene.

11. A process as claimed in claim 8, wherein the Lewis acid is selected from titanium (IV) chloride and boron trichloride.

12. A process as claimed in any one of claims 8 to 11, wherein the initiator system additionally has at least one aprotic polar compound III which is suitable for complex formation with the Lewis acid or with the carbocation or cationic complex formed under the reaction conditions from the Lewis acid and compound II.

13. A process as claimed in claim 12, wherein compound III is selected from pyridine, alkylpyridines and nonpolymerizable, aprotic organosilicon compounds having at least one Si—O bond.

14. A process as claimed in claim 11, wherein compound II and compound III are used in a III:II molar ratio in the range from 1:1 to 1:1 000.

15. A process as claimed in claim 8, wherein the solvent for the polymerization is selected from hydrocarbons having from 2 to 10 carbon atoms, inert halogenated hydrocarbons having from 1 to 3 carbon atoms and mixtures thereof.

16. A process as claimed in claim 8, wherein the polyisobutenes are recovered by removing the solvent at temperatures of at least 150° C.

* * * * *